US006433131B1

United States Patent
Zhou et al.

(10) Patent No.: US 6,433,131 B1
(45) Date of Patent: Aug. 13, 2002

(54) HIGH GLOSS ACRYLIC COATINGS WITH IMPROVED IMPACT RESISTANCE CURED WITH MELAMINE

(75) Inventors: Lichang Zhou; Shelby F. Thames, both of Hattiesburg; Oliver W. Smith, Petal, all of MS (US); Thomas Clayton Forschner, Richmond, TX (US); Roy Frank Smith, Pearland, TX (US); David Eric Gwyn, Houston, TX (US); Wyndham Henry Boon, North Canton, OH (US); Abdulai Mobolaji Dawodu, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/784,376

(22) Filed: Feb. 15, 2001

Related U.S. Application Data

(60) Provisional application No. 60/185,649, filed on Feb. 29, 2000.

(51) Int. Cl.[7] .................. C08G 63/62; B32B 27/36
(52) U.S. Cl. .................. 528/371; 528/371; 525/461; 525/467; 428/412
(58) Field of Search .................. 528/371; 525/461; 525/467; 428/412

(56) References Cited

U.S. PATENT DOCUMENTS

| | | | |
|---|---|---|---|
| 3,816,162 A | 6/1974 | Taylor | 117/46 |
| 3,900,682 A | 8/1975 | Taylor | 427/386 |
| 3,901,752 A | 8/1975 | Taylor | 156/155 |
| 4,018,727 A | 4/1977 | Taylor | 260/13 |
| 4,533,729 A | 8/1985 | Newland et al. | 528/371 |
| 5,212,321 A | 5/1993 | Muller et al. | 549/228 |
| 5,225,129 A | 7/1993 | van den Berg | 264/85 |
| 5,525,670 A | 6/1996 | Nishi et al. | 524/512 |
| 5,527,879 A | 6/1996 | Nakae et al. | 528/371 |
| 5,849,859 A | 12/1998 | Acemoglu | 528/271 |

FOREIGN PATENT DOCUMENTS

| | | | |
|---|---|---|---|
| EP | 0712873 A2 | 11/1995 | C08F/220/28 |
| JP | 64-1724 | 6/1989 | C08G/63/62 |
| JP | 5009434 | 1/1993 | |
| JP | 6313149 | 11/1994 | |

OTHER PUBLICATIONS

International Search Report of Dec. 5, 2001.

Primary Examiner—Duc Truong
(74) Attorney, Agent, or Firm—Donald F. Haas

(57) ABSTRACT

Disclosed is a modified acrylic coating composition cured with melamine characterized by improved impact resistance which comprises: An acrylic polyol dissolved in a suitable solvent to 40–90% solids; 2 to 50% by weight of said acrylic polyol substituted with a polytrimethylene carbonate polyol selected from a polytrimethylene carbonate diol, a polytrimethylene carbonate triol, or a higher functionality polytrimethylene carbonate polyol; a melamine crosslinking agent; optionally a catalyst; and optionally pigments and other additives commonly used in coatings. Also disclosed in a related embodiment is a melamine/urea formaldehyde polytrimethylene carbonate coating composition that is prepared without acrylic.

40 Claims, 6 Drawing Sheets

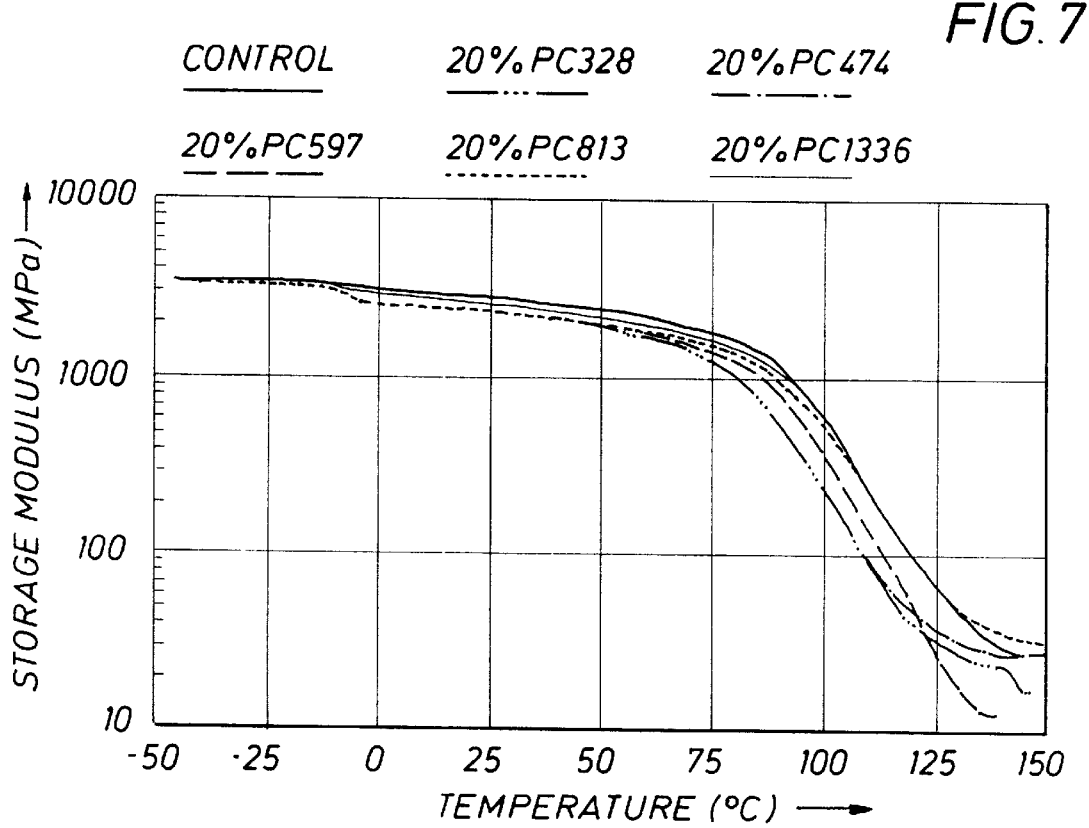
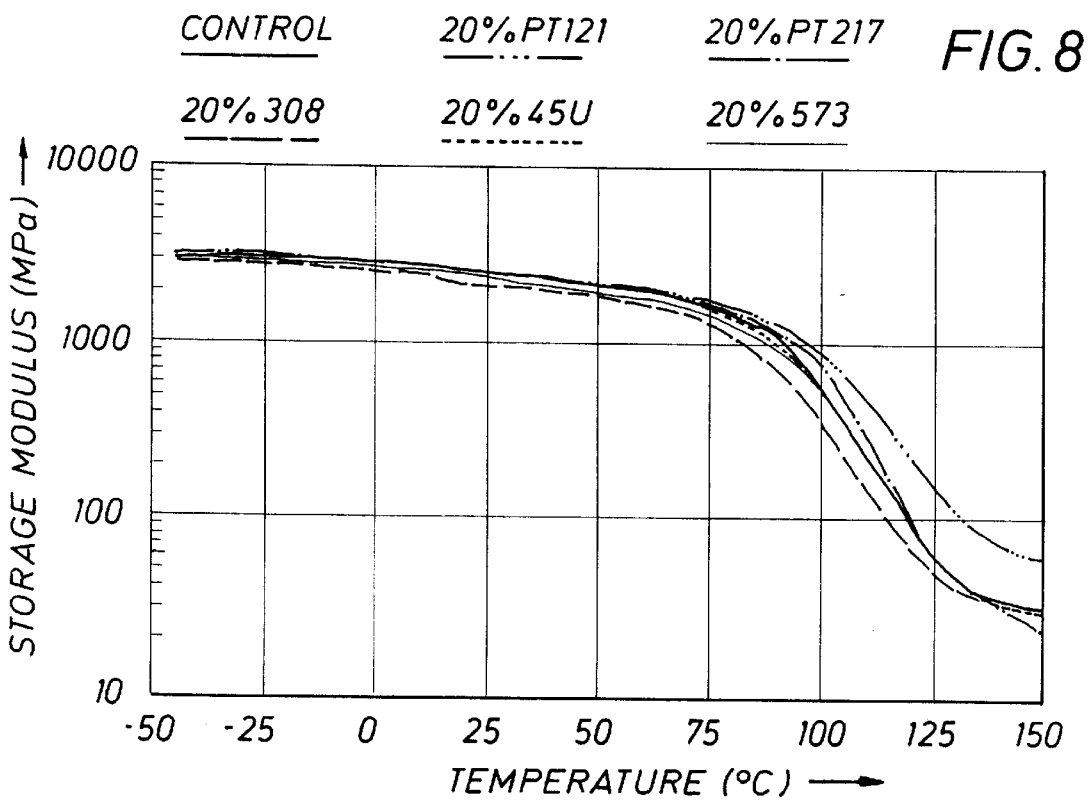

HIGH GLOSS ACRYLIC COATINGS WITH IMPROVED IMPACT RESISTANCE CURED WITH MELAMINE

CROSS REFERENCE

This application is related to U.S. patent application Serial No. 60/185,649, filed of even date Feb. 29, 2000 and incorporated by reference herein in the entirety.

FIELD OF INVENTION

This invention relates to acrylic coating compositions and, in particular, to a high gloss acrylic coating composition cured with melamine that demonstrates improved impact resistance. More particularly, this invention relates to the incorporation of polytrimethylene carbonate diols and triols into acrylic coatings cured with melamine to obtain high gloss acrylic coatings with improved impact resistance, with no significant loss of other properties.

BACKGROUND OF THE INVENTION

Thermoset or cured coating compositions are widely used in coatings operations on a variety of substrates, including plastic, metal, wood, primed metals, or previously coated or painted metals. One type of thermosetting coating is an acrylic coating composition. In automotive applications, in particular, acrylic coatings provide durable finishes. Acrylic coating compositions are well known and have been widely used to finish automobiles and trucks.

Automotive coatings include primers and topcoats, which may be single layer topcoats or two layer basecoat/clearcoat topcoat systems. The primer may be applied either as a first coating layer or over another layer, for example over an electrocoat primer layer. The topcoats are then usually applied as a protective coat over the primer layer.

In order to make the coating more chip resistant, one recognized solution is to cover all or parts of the finished surface of the automobile with a protective coating, however the acrylic enamel, acrylic lacquer, or nitrocellulose lacquer typically used on vehicles produce coatings which are difficult to overcoat with protective materials due to problems with adhesion, yellowing, etc. A useful protective coating composition should first and foremost be chip- and abrasion-resistant, have good adhesion to the painted surface, be clear, smooth (i.e., without surface roughness) and indistinguishable over the painted surface when applied to the areas being protected.

There are a number of considerations regarding the use of thermosetting coating compositions. One consideration involves the curing conditions needed to achieve sufficient crosslinking of the film, with higher curing temperatures and longer times at the curing temperature generally increasing the manufacturing costs of the coated article. Another concern in some cases is the generation of undesirable by-products of the curing reaction. For example, blocked curing agents may release the blocking agents as volatile organic compounds that are emissions regulated by various government regulations. It is also important that the crosslinks that are formed by curing thermosetting compositions are suitable for providing long life to the coating under the particular conditions to which the coated article will be exposed.

Several different crosslinking mechanisms may be employed in thermosetting coatings. Polyisocyanate crosslinkers may be reacted with amine or hydroxyl groups on the resin. This curing method provides desirable urea or urethane crosslinked bonds, but may also entail certain drawbacks. In order to prevent premature gelation of the coating composition, the polyisocyanate must either be kept separate from the resin in what is known in the art as a two-package or two-pack coating system, or else the highly reactive isocyanate groups on the curing agent must be blocked (e.g., with an oxime or alcohol). Blocked polyisocyanates, however, require higher temperatures (e.g., 150° C., or more) to unblock and begin the curing reaction. The volatile blocking agents released during curing can possibly adversely affect coating properties, as well as increase the volatile organic content for the composition.

Another curing mechanism utilizes a melamine formaldehyde resin curing agent in the coating composition to react with hydroxyl groups on the resin. Where suitable, this curing method provides good cure at relatively low temperatures, for example 250° F. or 121° C. with a blocked acid catalyst, or even lower with an unblocked acid catalyst, however higher curing temperatures can also be effective.

There are some advantages in curing with melamine where suitable. Melamine can exhibit moisture resistance, cure at lower temperatures, and can be extremely hard, and yet colorless. The moisture resistance feature of melamine-based adhesives, combined with its durability, may provide advantages for exterior applications. Curing temperatures as low as 140° F. have been used for melamine adhesives, with a normal range from 240–260° F. for 2 to 5 minutes, depending upon the thickness of the composite assembly. Crosslinked melamine-based coatings are colorless, chemically resistant and resilient. They provide a tough and durable finish to items that will be repeatedly exposed to harsh environments.

Few applications experience such demanding and harsh environments over time as automotive paints. In this application melamine can deliver chemical resistance and durability. Melamine resins also provide the long-term buffability vehicle owners desire. Melamine-based coatings also permit coils of metal sheeting to be prepainted, then stamped into the final product, as in the case of appliance and automotive parts and panels.

Another important benefit of high solids melamine-based coatings is that they are low in volatile organic emissions during application and curing.

The use of various modifiers to attempt to improve impact properties of acrylic coatings has been addressed in the art. Polytrimethylene ether glycol (PTMEG) has been suggested as a modifier, however at the expense of optimum UV resistance. The addition of glycol adipates to improve impact resistance has been suggested, but results in the reduction of hydrolytic stability. Impact modifiers previously proposed in the art typically result in the loss of other properties.

The preparation of trimethylene carbonate is known. U.S. Pat. No. 5,212,321 discloses a process for preparing trimethylene carbonate wherein 1,3-propanediol is reacted with diethylcarbonate in the presence of zinc powder, zinc oxide, tin powder, tin halide or organo-tin compound, at an elevated temperature. It is also known in the art to use polytrimethylene carbonate in polyester applications. See, for example, U.S. Pat. Nos. 5,225,129 and 5,849,859.

The preparation of polycarbonate polyols is known in the art. U.S. Pat. No. 4,533,729 discloses a process for preparing amorphous polycarbonate polyols by reacting phosgene, a branched-chain polyhydric alcohol, and a straight chain polyhydric alcohol in the presence of a solvent and in the absence of a catalyst at a temperature of from about 60° to 100° C. The reaction mixture is then contacted with a catalytic amount of a tertiary amine at reflux temperature for a period of time of at least about 30 minutes. It is suggested the resulting polycarbonate polyol can be used in coating compositions. In JP 64001724 there is disclosed the preparation of a polycarbonate polyol from (di) allyl-, alkyl- or alkylene carbonate and a polyhydroxy compound using a titanium catalyst.

Polycarbonates have been used in acrylic and polyester coatings. U.S. Pat. No. 5,525,670 describes a coating composition based on either acrylic or polyester resins modified with polycarbonates which are cured by either urethane or melamine formaldehyde chemistries. The polycarbonate described preferably has a number average molecular weight above 2000. The polycarbonate of this reference is made from a mixture of straight chain diols, branched chain diols, and polyhydric alcohols and an aliphatic carbonate, where both the branched chain diols and the polyhydric alcohols are present in at least 10 mol %. It is stated in this reference that if less than 10 mol % is present, the material crystallizes (branched chain diol), and inferior curing characteristics (polyhydric alcohols) and inferior water resistance (polyhydric alcohols) are exhibited. Also see U.S. Pat. No. 5,527, 879.

EP 0 712 873 A2 describes an acrylic copolymer which is an acrylic monomer having a hydroxy alkyl carbonate group and an acid group-containing monomer. The composition is said to be crosslinked with melamine to prepare a thermosetting water borne coating composition.

There does not appear to be any reference in the art that discloses or suggests the use of polytrimethylene carbonate diols and triols and higher functionality polyols in relatively small amounts to provide improved impact resistance in acrylic melamine coatings.

There is a need in the art for coating compositions with improved impact resistance. Attempts have been made to produce tougher, more chip-resistant coatings, particularly for automobiles, but these have not been completely satisfactory. In view of the some of the desirable properties of melamine as a crosslinking agent, it would be particularly desirable if it were possible to obtain acrylic melamine coatings with improved impact resistance, with minimal effect on other properties.

SUMMARY OF THE INVENTION

In the present invention it has been found that modified acrylic melamine coatings with improved impact resistance can be achieved through incorporation of polytrimethylene carbonate diols and triols, and higher functionality polytrimethylene carbonate polyols. Furthermore, these improvements were observed while maintaining high gloss, weather resistance, and overall durability. It has surprisingly been found that to have both high impact resistance and high gloss, polytrimethylene carbonate diols and triols, and higher functionality polytrimethylene carbonate polyols within a specific molecular weight range provide the best results.

In a related embodiment of the present invention it has also been found that a new baked coating composition can be prepared without acrylic from poly (trimethylenecarbonate), optionally substituted with a glycol, and a melamine/urea formaldehye which provides a number of formulating options for coatings manufacturers. Various formulations have been demonstrated to have desirable levels of adhesion, mar resistance, and low haze.

In accordance with the foregoing, the present invention in the first embodiment comprises: A modified acrylic coating composition cured with melamine characterized by improved impact resistance which comprises:
  a) An acrylic polyol dissolved in a suitable solvent to 40–90% solids;
  b) 2 to 50% by weight of said acrylic polyol substituted with a polytrimethylene carbonate polyol selected from a polytrimethylene carbonate diol, a polytrimethylene carbonate triol, or a higher functionality polytrimethylene carbonate polyol;
  c) A melamine crosslinking agent;
  d) Optionally a catalyst; and
  e) Optionally pigments and other additives known in the art and used in coatings.

In the second embodiment, where no acrylic is incorporated, the invention comprises:
A melamine/urea formaldehyde polytrimethylene carbonate coating composition comprising:
  a) 5 to 80% by weight polytrimethylene carbonate, optionally blended with 0 to 30% glycol;
  b) 5 to 70% by weight melamine crosslinking agent;
  c) 0 to 70% solvent; and
  d) Optionally a catalyst The compositions can be applied over a variety of substrates.

BRIEF DESCRIPTION OF THE DRAWINGS

FIG. 7 is a graph of the storage modulus versus temperature curves of PTMC diol modified melamine coatings.

FIG. 8 is a graph of storage modulus versus temperature curves of PTMC triols modified melamine coatings.

DETAILED DESCRIPTION OF THE INVENTION

Figure 1:
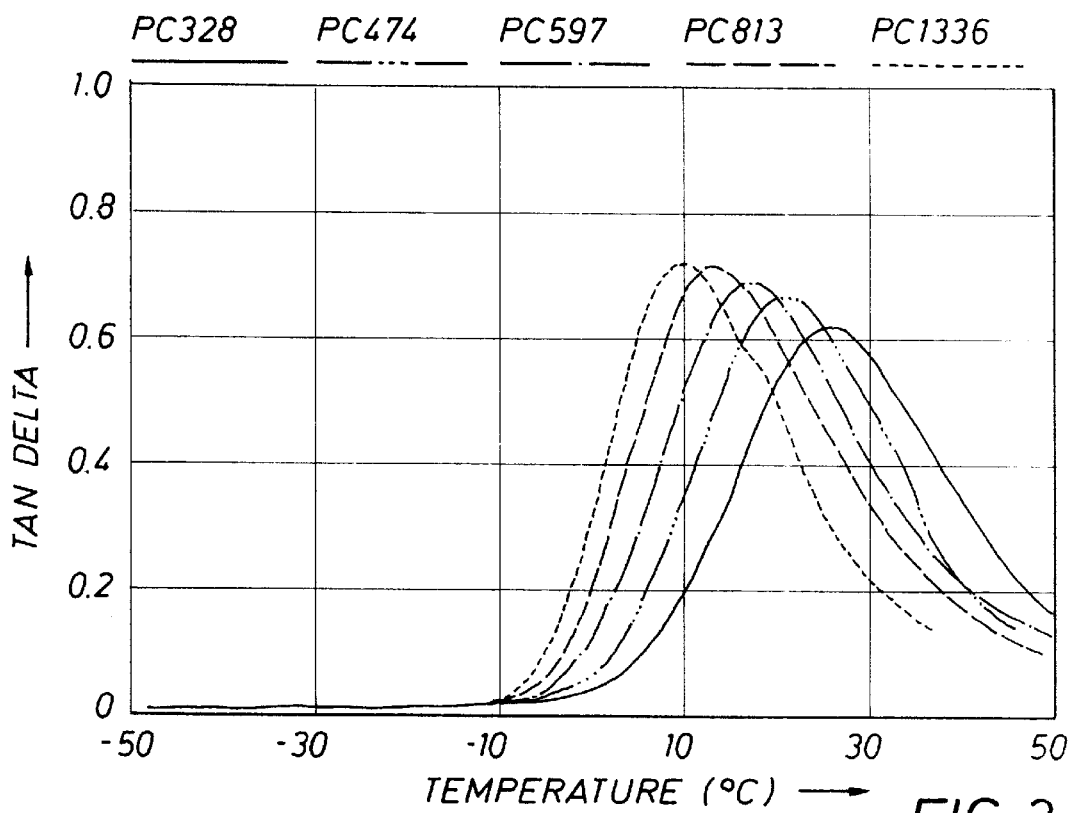
FIG. 1 is a graph of the tan delta versus temperature curves of PTMC diol coatings.

In the present invention poly(trimethylene carbonate) polyols (hereafter referred to as PTMC polyols) were examined as modifiers for acrylic melamine coatings and, in a second embodiment, for coatings where no acrylic was used.

Typically when PTMC polyols are incorporated into acrylic polyols as potential coatings modifiers, problems can be observed with phase separation, hazy coating appearance, and reduced gloss. In the present invention we have discovered that the compatibility of PTMC with acrylic copolymers can be greatly improved by lowering the carbonate molecular weight and increasing PTMC polyol functionality. In addition, it has surprisingly been found that the use of lower percentages of polytrimethylene carbonate diols and triols provides the desired improvements in key properties of the cured compositions. Furthermore, it has been found that to have both high impact resistance and high gloss, the poly(trimethylenecarbonate) must be within a specific molecular weight range. PTMC polyols used in the first embodiment of the invention had molecular weights from about 360 to about 2700, with molecular weights below 2000 more suitable. Overall performance, particularly with respect to coating gloss and appearance, was found to be a function of molecular weight, with PTMC polyols having molecular weights less than 1500 providing very good results. It was found that coating performance improved with increasing PTMC polyol molecular weight until incompatibility adversely impacted the gloss and overall appearance. Examples demonstrate that PTMC polyols having molecular weights less than 1000 are very compatible as modifiers and result in no loss of gloss.

In the examples 2 to 50 wt %, preferably 5 to 20 wt % poly(trimethylenecarbonate)polyol, comprising preferably PTMC diols with equivalent weights ranging from 324 to 1336 and triols with equivalent weights ranging from 121 to 573(Table 2) were incorporated into an acrylic polyol and crosslinked by a melamine crosslinking agent.

The effect of curing conditions, PTMC polyol molecular weights, and level used in the formulation on coating properties were evaluated. DMA analysis revealed a preferred molecular weight range for the PTMC polyols. Higher molecular weight PTMC polyols resulted in incompatible coatings with hazy appearance and reduced gloss compared to the control. In comparison with higher molecular weight PTMC polyols, PTMC diols and triols with lower molecular weights were more compatible with the acrylic polyol, provided cured coatings with the desired properties, and had less tendency to crystallize. For example, at 20 wt % PTMC diol, improved impact resistance with high gloss is obtained when the equivalent weight is equal to or less than 328, when applied to polished iron phosphated steel panels. For PTMC triols, improved impact with high gloss is obtained for equivalent weights up to 308.

The PTMC polyol modifiers of the present invention exhibited additional improvements compared with the control or at least maintained desirable properties. The PTMC polyol modifiers provided improved flexibility for the melamine coatings. The PTMC modifiers also provided a significant improvement in coating adhesion. Under UV testing improved non-yellowing properties were observed. Incorporation of the carbonate polyols had no appreciable effect on pencil hardness, chemical and stain resistance, or MEK double rub resistance. All fully cured coatings exhibited good humidity resistance.

The acrylic melamine coating composition of the present invention requires a polyol, a PTMC diol, triol, or higher functionality PTMC polyol, a solvent, optionally a co-solvent, a melamine crosslinking agent, and optionally an acidic catalyst.

A variety of polyols can be used, including, but not limited to, polyether polyols, polyurethane polyols, acrylic polyols, and polyester polyols.

The acrylic polymers are copolymers of one or more alkyl esters of acrylic acid or methacrylic acid optionally together with one or more other polymerizable ethylenically unsaturated monomers. These polymers are generally of the thermosetting crosslinking type. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate. Acrylic polymers can be prepared via aqueous emulsion polymerization techniques or can be prepared via organic solution polymerization techniques. Generally, any method of producing such polymers that is known to those skilled in the art utilizing art recognized amounts of monomers can be used.

Suitable functional monomers may be used in addition to the other acrylic monomers mentioned above for crosslinking purposes and include, for example, acrylic acid, methacrylic acid, hydroxyalkyl acrylates, and hydroxyalkyl methacrylates. Preferably, the hydroxyalkyl group of the latter two types of compounds contains from about 2 to 4 carbon atoms. Examples thereof are hydroxyethyl acrylate, hydroxyethyl methacrylate, hydroxypropyl acrylate, hydroxypropyl methacrylate, 4-hydroxybutyl acrylate and 4-hydroxybutyl methacrylate and the like. Also, the acrylic polymer can be prepared with N-(alkoxymethyl)acrylamides and N-(alkoxymethyl)methacrylamides.

The polymeric film-forming resin for the composition can also be selected from suitable polyesters. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane, pentaerythritol, 1,3-propanediol, and 2-methyl-1,3-propanediol.

Suitable dicarboxylic acids are known to those skilled in the art and include terephthalic acid, isophthalic acid, succinic acid, adipic acid, azelaic acid, sebacic acid, maleic acid, fumaric acid, phthalic acid, tetrahydrophthalic acid, hexahydrophthalic acid, dodecanedioic acid, and trimellitic acid. In addition to the polycarboxylic acids mentioned above, functional equivalents of the acids, such as anhydrides, where they exist, or lower alkyl esters of the acids, such as the methyl esters, may be used.

Acrylic polyols are preferred for good results. Suitable acrylic polymers have an equivalent weight of about 300 to 1300 and a hydroxyl value of 43 to 187. Preferably, the acrylic polymer has an equivalent weight of about 400 to 700 and a hydroxyl value of 80 to 140.

Suitable acrylic polyols are, for example, SCX 902, SCX 912, and Joncryl® 587, commercially available from S. C. Johnson Polymer. The acrylic polyol used in the examples to demonstrate the benefits of the PTMC diols and triols was Joncryl® 587 polyol. Joncryl® 587 typically has a hydroxyl number of 94, an equivalent weight of 600, an acid number<5, and a glass transition temperature of 50° C. Joncryl®587 is a solid flaked acrylic polyol designed for use in thermosetting coatings at conventional solids. Joncryl®587 allows the formulator to select the solvent and the optimized equivalent weight of this product results in sufficient crosslink density to provide good chemical and solvent resistance.

The melamine resin used for the curing agent of the present invention may be the resin obtained by addition-condensation of an amine compound such as melamine, guanamine, and urea with formaldehyde by art-known methods, or the resin obtained by further addition-condensation of such resin with alcohol. For instance, it may be methylated melamine, butylated melamine, methylated benzoguanamine, butylated henzoguanamine, etc.

Particularly suitable crosslinking agents are fully or partially methylolated melamine resins, such as hexamethylol melamine, pentamethylol melamine, tetramethylol melamine, etc. These are made by reacting 6 or less moles of formaldehyde with each mole of melamine. The reaction causes the addition of hydroxymethyl groups to the amine groups of the melamine resin. The fully or partially methylolated melamine may also be fully or partially alkylated by reacting with an alcohol, such as methanol. In acid environments (pH preferably less than 5) at elevated temperatures (preferably about 250° F.), these melamine-formaldehydes react with the hydroxy groups of the resin to form complex crosslinked polymer structures.

Suitable melamine resins include those hydrophilic melamines and/or hydrophobic melamines, such as, for example, CYMEL®303, CYMEL®325, CYMEL®1156, manufactured by Cytec; YUBAN 20N, YUBAN 20SB, YUBAN 128, manufactured by Mitsui Toatsu Chemicals, Inc.; SUMIMAL®M-50W, SUMIMAL®M-40N, SUMIMA®L M-30W, manufactured by Sumitomo Chemical Co. Ltd, and the like, used alone or in combinations.

In the examples, good results were achieved using CYMEL®303, a hexamethoxymethylmelamine resin, commercially available from Cytec. Melamine resins of this type may be produced as set forth in U.S. Pat. Nos. 2,906,724; 2,918,452; 2,998,410; 2,998,411; 3,107,227; 3,422,076, all of which patents are incorporated herein by reference in the entirety.

Suitable solvents for use in the invention include a number of conventional solvents, however PTMC diols were not soluble in aliphatic or aromatic hydrocarbon solvents, such as, for example, hexane, toluene, xylene, etc. Examples of solvents which are generally suitable include, but are not limited to, esters such as butyl acetate, n-propyl acetate, and ethylene glycol diacetate; ketones such as methyl ethyl ketone, methyl n-propyl ketone, and methyl amyl ketone; ethers such as propylene glycol methyl ether acetate and ethylene glycol methyl ether acetate; and alcohols, such as butanol and diacetone alcohol. The preferred solvents were glycol ethers and/or esters, particularly propylene glycol methyl ether acetate (PGMA), which is also a good solvent for acrylic polyols. It was also desirable to incorporate a co-solvent to improve the solubility and evaporation rate for coatings applications.

Suitable co-solvents include, but are not limited to, methyl ethyl ketone, methyl n-propyl ketone, acetone, ethyl acetate, methyl isobutyl ketone, and tertiary butyl acetate. The preferred co-solvent was methyl ethyl ketone (MEK). About 0 to 40% of the primary solvent used in the formulations was substituted with co-solvent, preferably from about 10 to 30%.

The coatings can be cured without the use of catalyst. However, a catalyst can optionally be used to promote the crosslinking reaction of the melamine crosslinking agent with the acrylic polyols. Suitable catalysts include acid catalysts, such as, for example, p-toluenesulfonic acid, xylenesulfonic acid, dodecyl benzene sulfonic acid, didodecyl naphthalene sulfonic acid, didodecyl naphthalene sulfonic acid, dinonyl naphthalene sulfonic acid, dinony naphthalene disulfonic acid, their amine blocks, phosphoric acid, etc.

The catalyst used to demonstrate the invention is dinonyl naphthalene disulphonic acid, sold under the name of Nacure®155, and commercially available from King Industries, Inc. Where an acid catalyst was employed, an effective amount was 0.1 to 3.0% based on the total weight of the resin. The preferred amount of catalyst was about 0.5 to 2.0%, most preferably about 1.0%.

The composition can be applied over a wide variety of substrates such as plastic, metal, wood, primed metals, or previous coated or painted metals. If used on an existing finish, the composition is usually applied over an acrylic primer surfacer. The composition can be applied directly to an acrylic lacquer or enamel finish that has been sanded and cleaned with an aliphatic hydrocarbon solvent. The composition can be applied as an original finish over an epoxy primer or other conventional primers or can be applied directly to bare metal. It is preferred to have the metal surface treated with a phosphate.

The coating composition may contain, in addition to the above components, about 0.5–5% by weight, based on the weight of the binder, of ultraviolet light stabilizers, preferably a derivative of benzophenone, such as, for example, benzotriazole.

Other useful ultraviolet light stabilizers are: Benzophenones such as hydroxydodecycl benzophenone, 2,4-dihydroxybenzophenone, hydroxybenzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic monoesters of 2,2', 4-trihydroxy-4'-alkoxybenzophenone, 2-hydroxy-4-methoxy-2'-carboxybenzophenone; triazoles such as 2-phenyl-4-(2'-4'-dihydroxybenzoyl)triazoles, substituted benzotriazoles such as hydroxyphenyltriazoles such as 2-(2'-hydroxy-5'-methylphenyl)benzotriazole, 2-(2'-hydroxyphenyl)benzotriazole, 2-(2'-hydroxy-5'-octylphenyl)naphthotriazole; triazines such as 3,5-dialkyl-4-hydroxyphenyl derivatives of triazine, sulfur-containing derivatives of dialkyl-4-hydroxyphenyltriazines, hydroxypheny-1,3,5-triazines and such triazines containing sulfonic acid groups, aryl-1,3,5-triazines, orthohydroxyaryl-s-triazine; and benzoates such as dibenzoate of diphenylolpropane, t-butyl benzoate of diphenylolpropane, nonyl phenyl benzoate, octyl phenyl benzoate, and resorcinol dibenzoate.

The coating may also optionally contain color pigments or metallic pigments known to those skilled in the art. Suitable metallic pigments include, for example, aluminum flake, copper bronze flake, and metal oxide coated mica. The coating may also include nonmetallic colored pigments conventionally used in surface coating compositions, including inorganic pigments such as titanium dioxide, iron oxide, chromium oxide, lead chromate, carbon black, and the like, and organic pigments such as phthalocyanine blue and phthalocyanine green.

In general, pigment is incorporated in amounts of about 1 to 80 percent by weight based on weight of coating solids. Metallic pigmentation is employed in amounts from about 0.5 to 35 percent by weight of the aforesaid aggregate weight. If desired, the coating composition may additionally contain other materials well known in the art of formulating surface coatings such as surfactants, flow control agents, thixotropic agents, fillers, anti-gassing agents, and other similar auxiliary additives.

In order to formulate the modified coatings, the acrylic polyol was dissolved in a suitable solvent to about 40–70%, preferably 50–60% solids. The PTMC diols and triols were typically dissolved in PGMA and a co-solvent to improve solubility and evaporation rate for the coating composition, to about 40–70%, preferably 50–60% solids. The PTMC diols and triols were incorporated into the formulation at 5, 20, and 50% levels, based on the weight of total polyols. The resulting polyol solutions were then blended in a high-speed mixer. A weight ratio of polyols to melamine of about 65–90/10–35, preferably 70–80/20–30, and more preferably about 75/25, was used to provide crosslinked coatings. An acid catalyst was used to provide acceptable cure rates for the coatings.

Where the film was cured, the desired results were obtained using temperatures in the range of from about 120° C. to 240° C., more often from about 140° C. to 200° C., with curing temperatures at or above 150° C. providing better results. For example, all PTMC polyol modified melamine coatings baked at 150° C. for 30 minutes exhibited excellent humidity resistance.

Dynamic Mechanical Analysis of the Modified Acrylic Coatings

Figure 2:
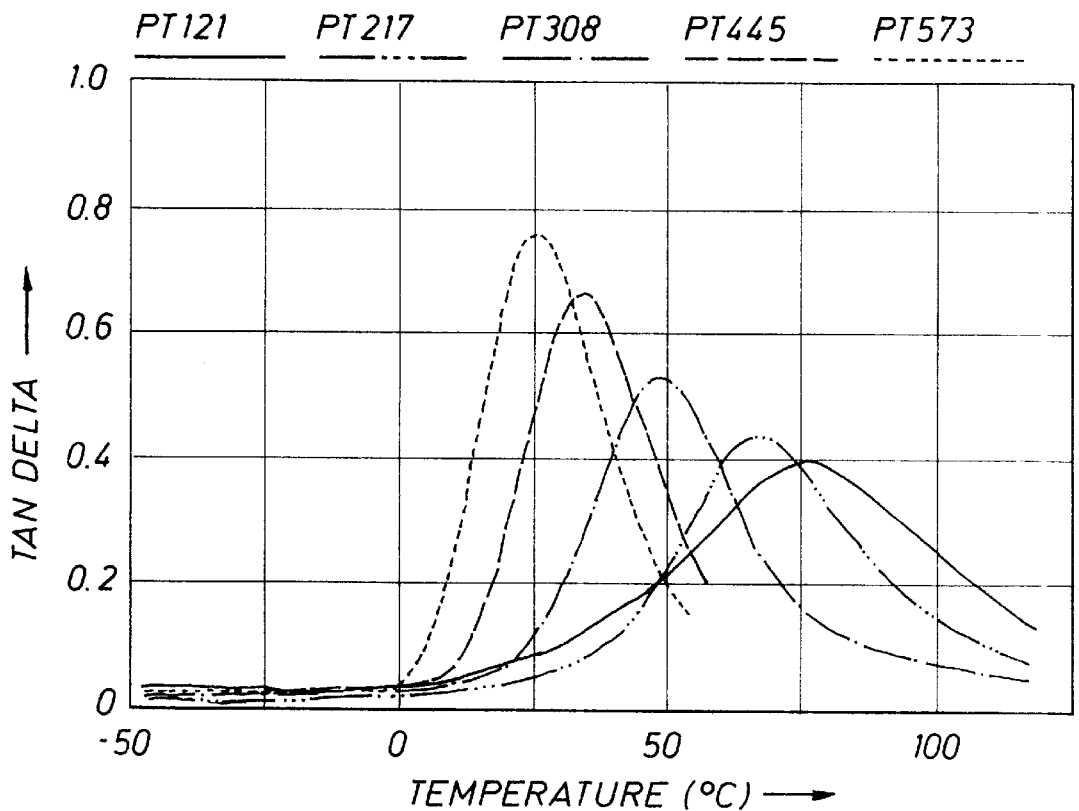
FIG. 2 is a graph of the tan delta versus temperature curves of PTMC triol coatings.
Figure 3:
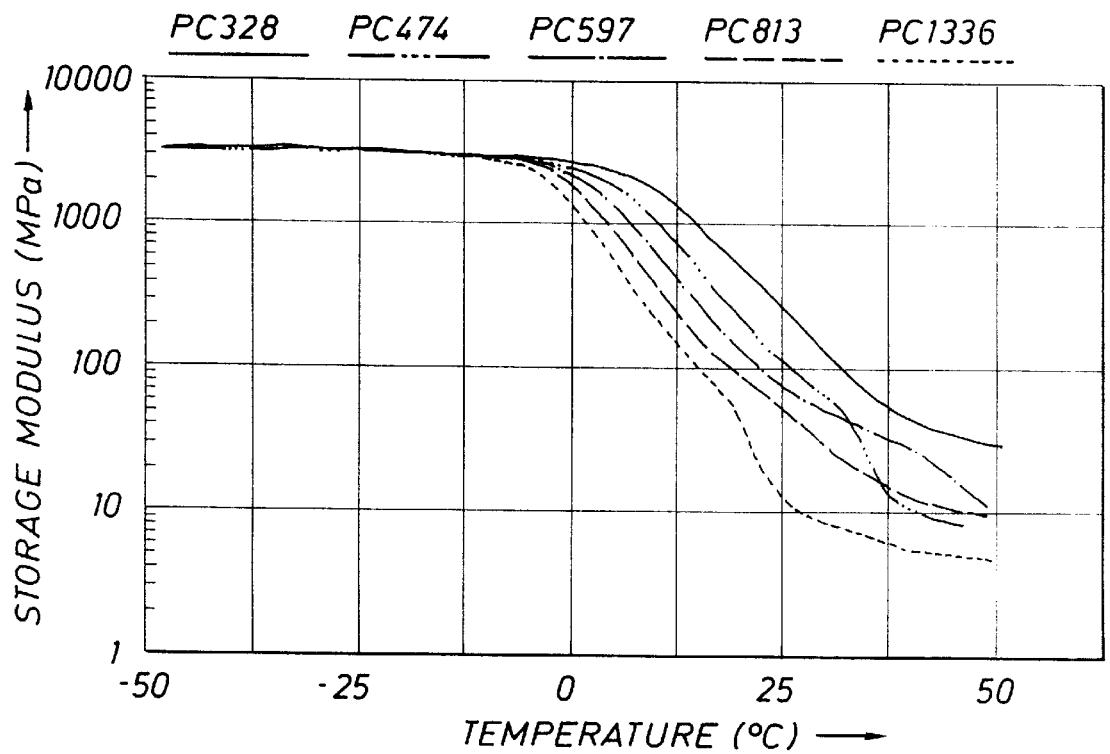
FIG. 3 is a graph of the storage modulus versus temperature curves of PTMC diol coatings.
Figure 4:
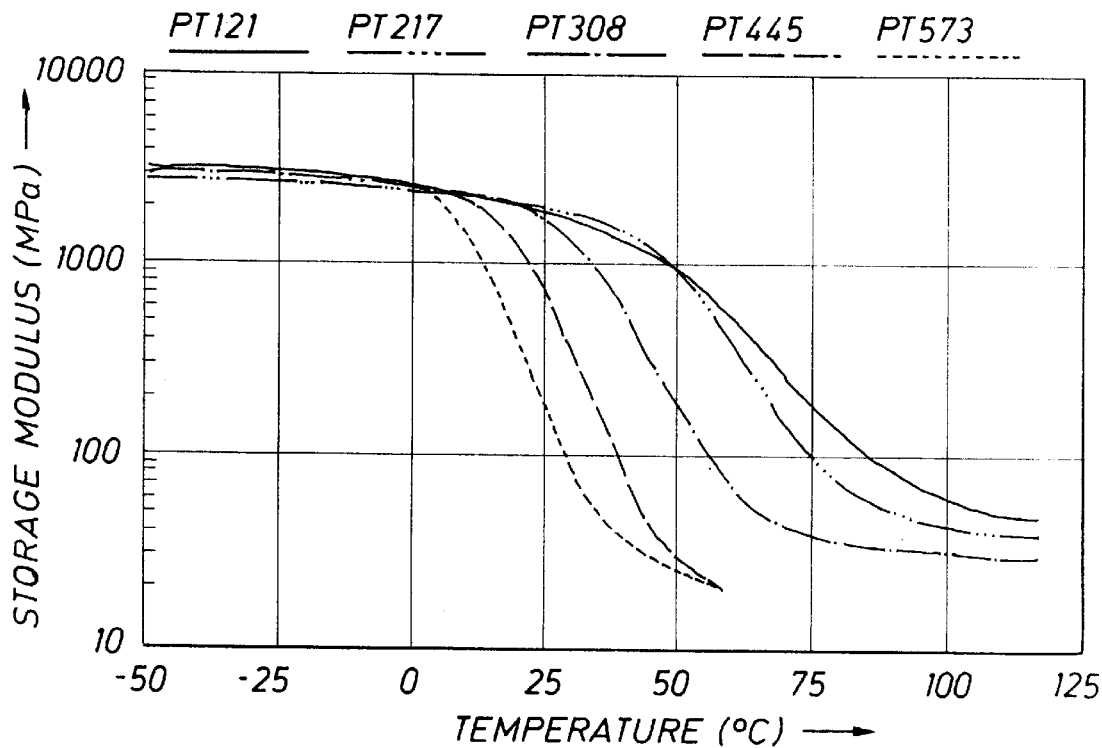
FIG. 4 is a graph of the storage modulus versus temperature curves of PTMC triol coatings.

Dynamic mechanical analysis confirmed that the glass transition temperature ($T_g$) of the PTMC polyol modified acrylic melamine coatings decreased with increasing PTMC molecular weights, likely a function of crosslink density. PTMC triols provided a wider range of $T_g$ values than the diols over the molecular weight range investigated. $T_g$s for the triol coatings decreased from 76° to 25° C. with increasing the triol molecular weights, while the $T_g$ range for the diol coatings varied from 25 to 9° C. The damping-temperature curves of pure PTMC diol and triol cured films with melamine formaldehyde are given in FIGS. 1 and 2, while their moduli variation with temperature are given in FIGS. 3 and 4, respectively.

Figure 5:
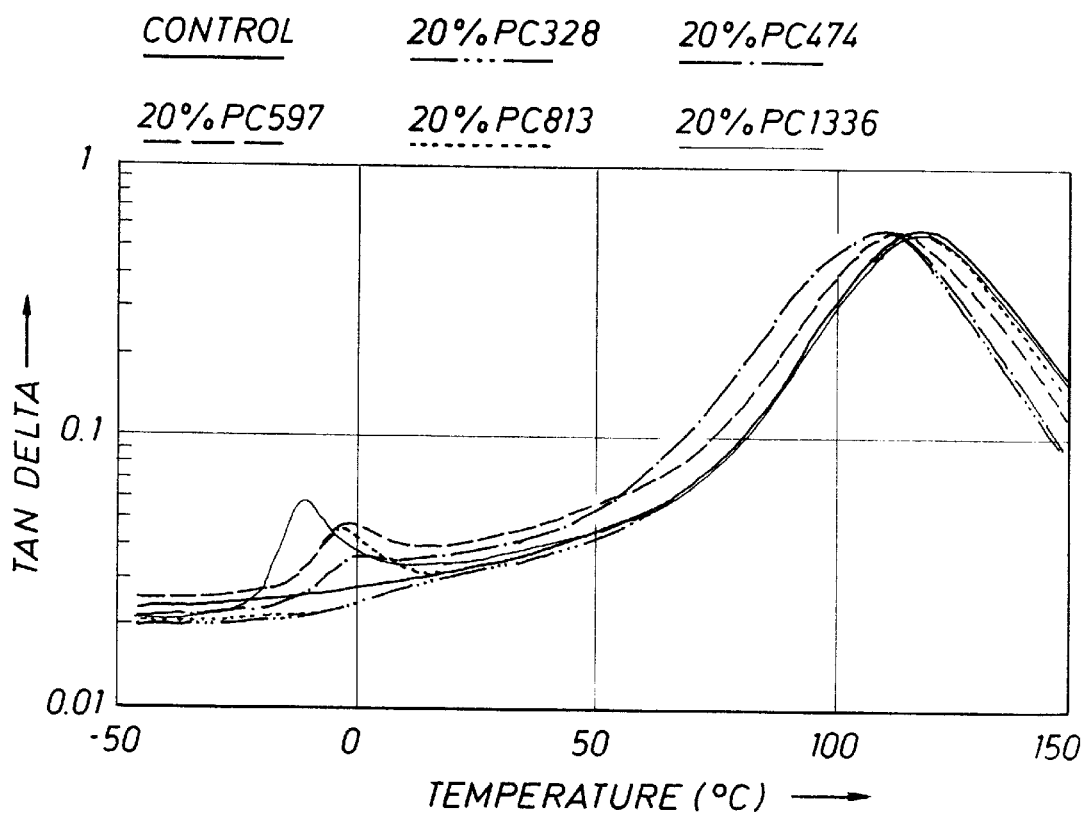
FIG. 5 is a graph of the tan delta versus temperature curves of PTMC diol modified melamine coatings.
Figure 6:
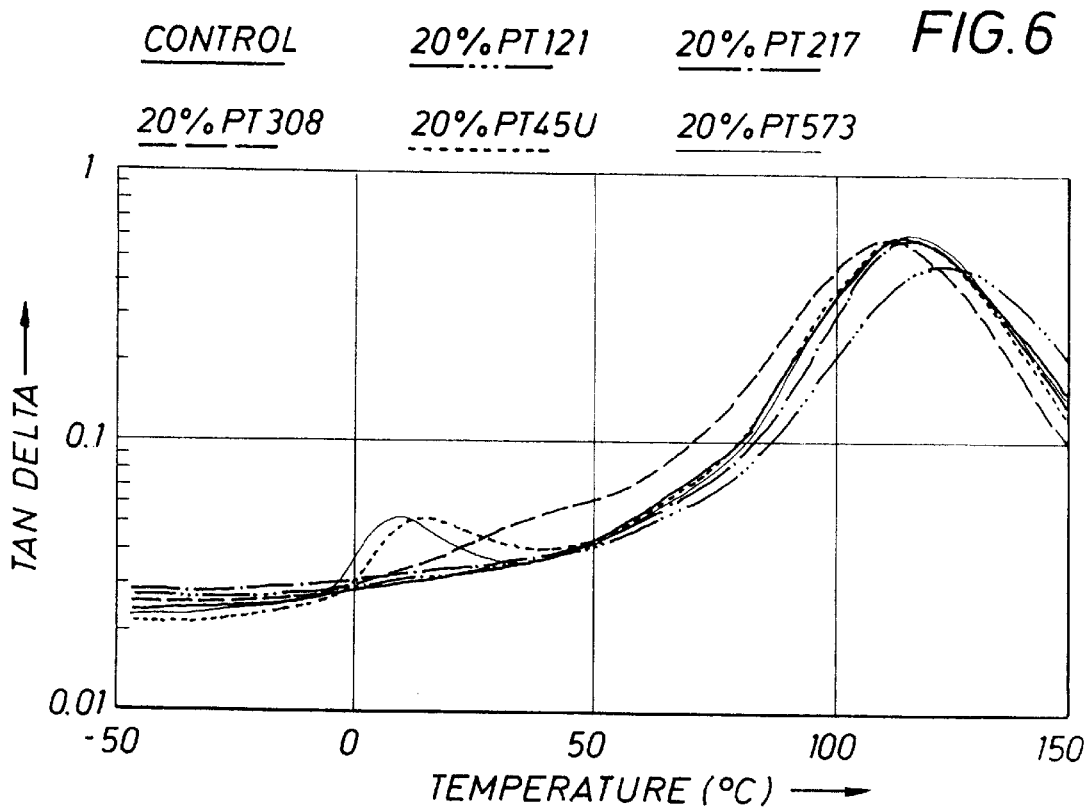
FIG. 6 is a graph of the tan delta versus temperature curves of PTMC triol modified melamine coatings.

Two separate peaks were clearly visible for both of the diols and triols with higher molecular weight modified coatings when Tan delta was plotted vs. temperature for 20% PTMC diol and triol modified melamine coatings (FIGS. 5 and 6). DMA properties of polymers are primarily sensitive to the microstructure of the materials. For a two component system only one relaxation is shown in the damping-temperature curve when the two polymers are compatible. A two-phase system shows two peaks. Hence, DMA studies indicate that the higher molecular weight PTMC polyols were incompatible with the acrylic copolymer.

The two peaks in the damping-temperature curves correspond to the $T_g$ of the crosslinked acrylic polyol exhibiting the main relaxation at higher temperature, and the crosslinked PTMC modifiers providing the relaxation at low temperature. The data also indicated that incorporation of PTMC polyols resulted in reduced $T_g$s for the modified coatings, i.e., the main relaxation at the high temperature (FIGS. 5 and 6). Therefore, DMA studies confirm that higher molecular weight PTMC diols and triols are essentially immiscible with the acrylic polyol, thereby giving rise to a hazy appearance and reduced gloss.

The storage modulus was also affected with incorporation of the PTMC polyol modifiers. The storage modulus-temperature curves of 20% carbonate diols and triols modified coatings resulted in slightly reduced modulus at room temperature compared with the control (FIGS. 7 and 8).

Appearance and Gloss

Figure 9:
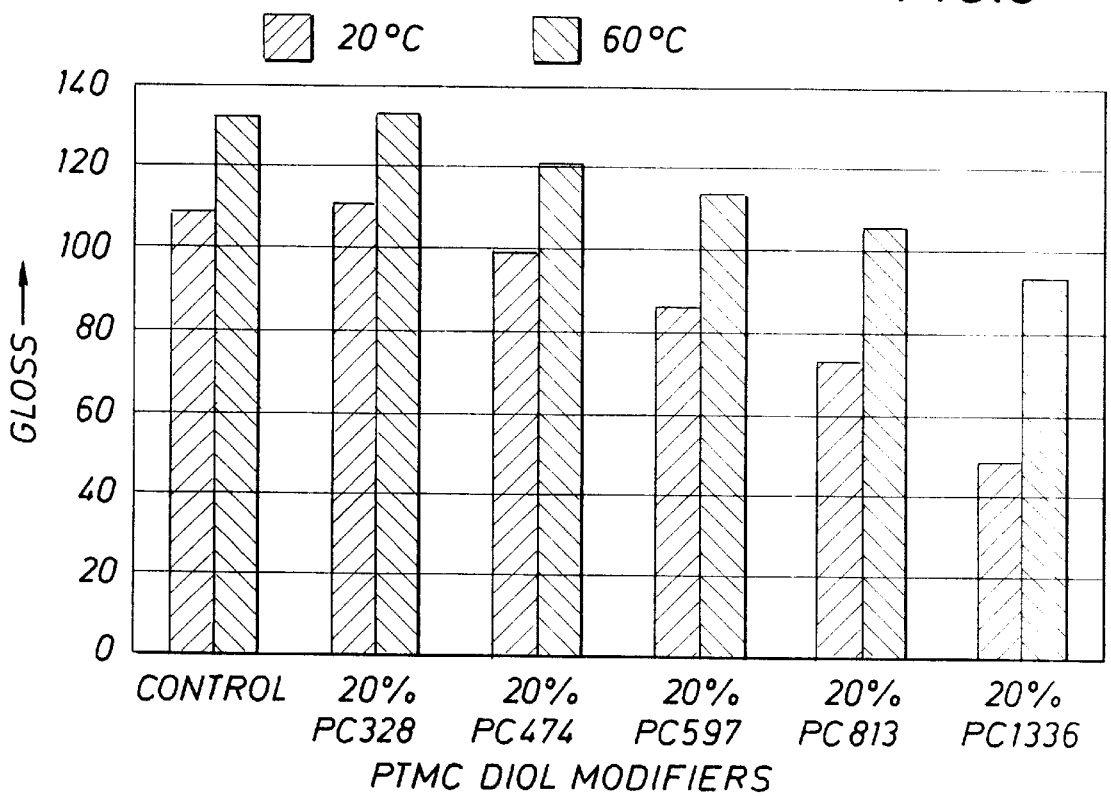
FIG. 9 is a bar graph of 20° and 60° gloss of PTMC diol modified melamine coatings.
Figure 10:
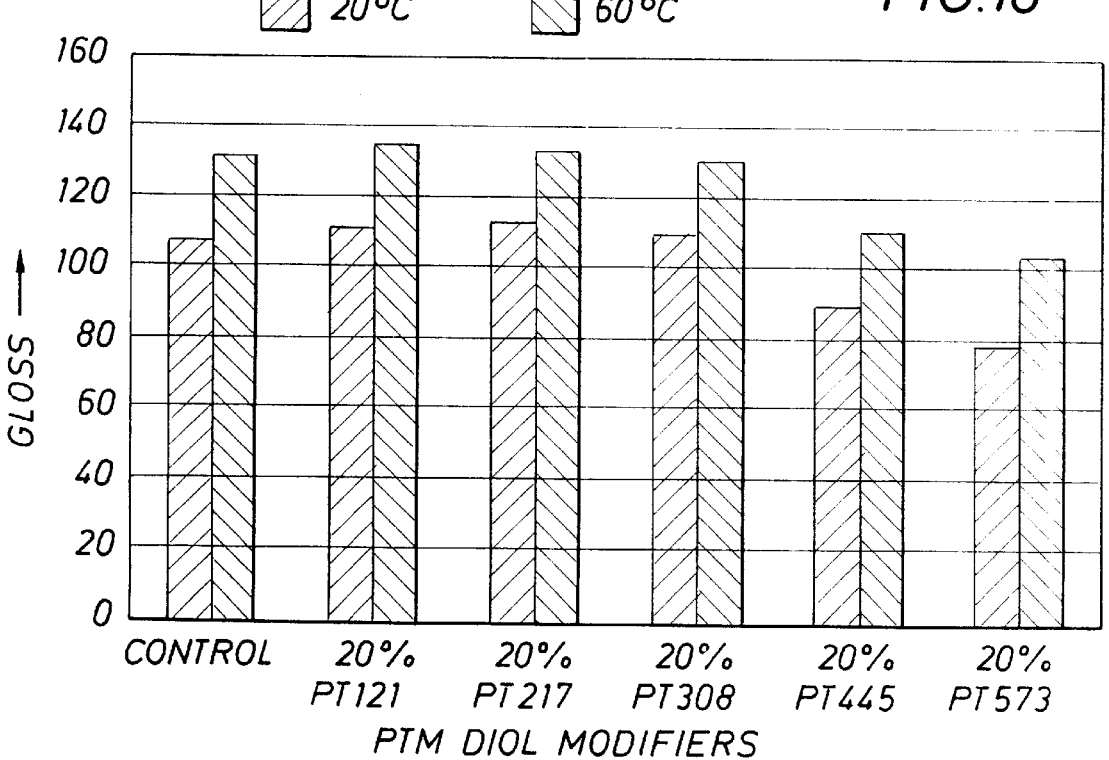
FIG. 10 is a bar graph of 20° and 60° gloss of PTMC triol melamine coatings.

The immiscibility effect of the acrylic polyol and PTMC polyol modifiers on coating appearance was generally obvious over polished iron phosphated steel panels. For instance, the low molecular weight PTMC polyols modified coatings and the control were clearly transparent, while the higher molecular PTMC polyol modified coating exhibited visual haze. This hazy appearance had a detrimental affect on the coatings gloss, however no loss of 20° or 60° gloss was observed in coatings modified with low molecular weight PTMC polyols such as PC328 diol and PT 217, PT121, and PT308 triols (FIGS. 9 and 10). Gloss generally decreased with increasing PTMC molecular weights. Therefore, the incompatibility of the PTMC modifier with acrylic polyol resulting in the loss in gloss is attributed to phase separation consistent with DMA data.

Humidity Resistance Test

Figure 11:
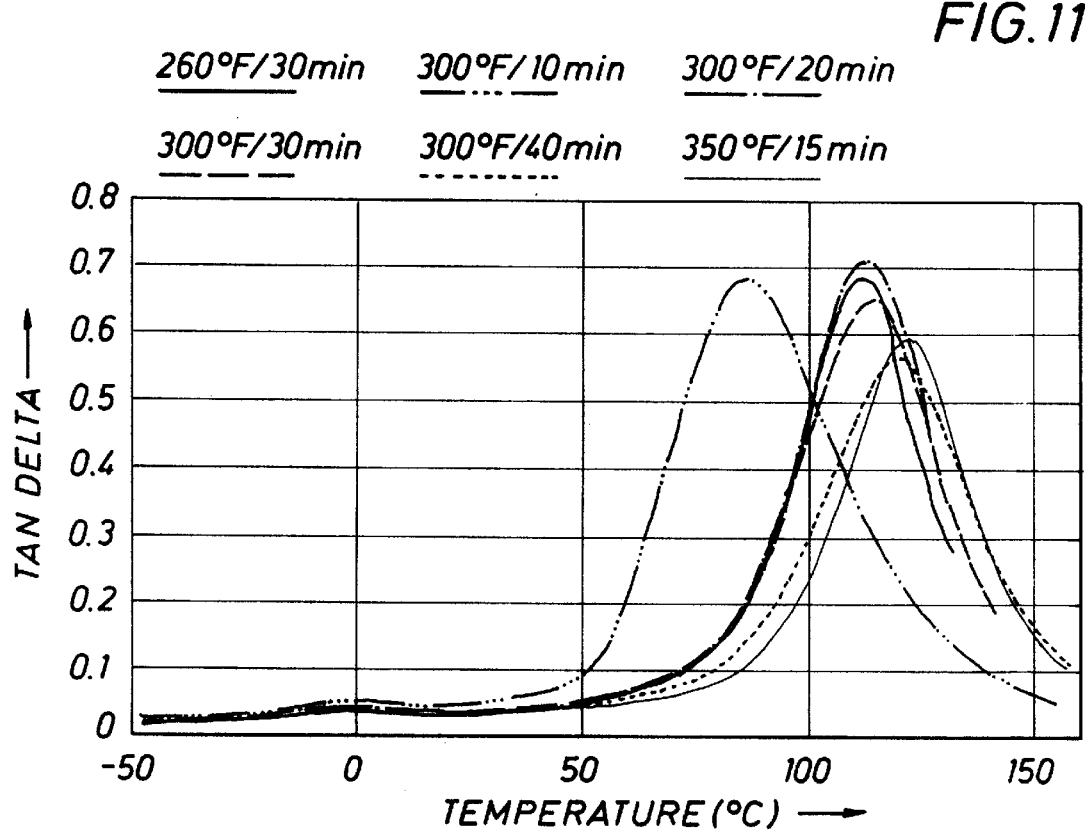
FIG. 11 is a graph of the effect of curing conditions on $T_g$ of 20% PC597 modified melamine coatings.
Figure 12:
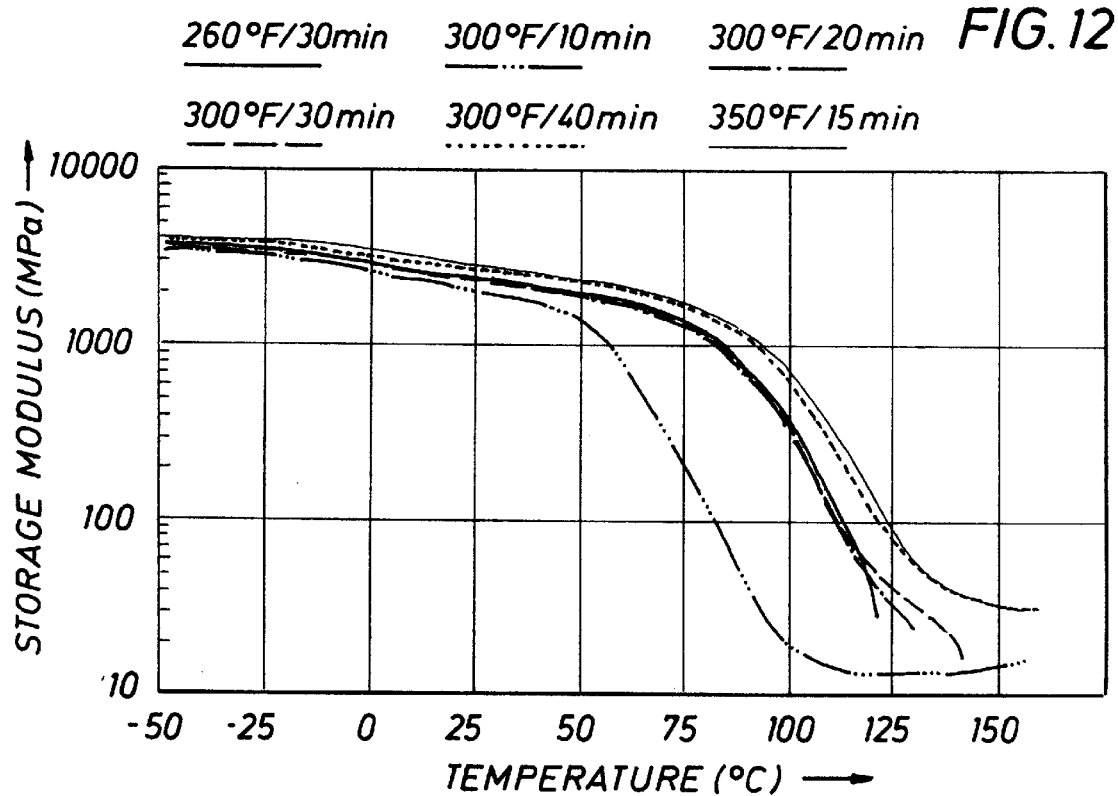
FIG. 12 is a graph of the effect of curing conditions on modulus of 20% PC597 modified melamine coatings.

Dynamic mechanical analysis (DMA) showed that the $T_g$ and storage modulus increased when the curing temperatures and/or the curing time increased (FIGS. 11 and 12).

Modification of Pigmented Coatings

The effect of PTMC polyols on the performance of the pigmented acrylic melamine coatings can be summarized by the following observations:

1. PTMC polyol modifiers improved the flexibility of pigmented melamine coatings.
2. PTMC polyol modifiers had no effect on the ultimate hardness, acid, caustic, mustard, and gasoline resistance.
3. Pigmented PTMC polyol modified coatings had good gloss retention compared to the control and to modified clear top coatings.
4. The PTMC polyol modified melamine coatings exhibited equivalent resistance to UV radiations as indicated by gloss and color change compared to the control.

Polytrimethylene Carbonate Melamine/Urea Formaldehyde Baked Coatings

In the related embodiment of the invention in which new melamine/urea formaldehyde polytrimethylene carbonate coating composition is prepared, a polycarbonate, optionally substituted with a glycol, is reacted in the presence of a solvent, and optionally a co-solvent, with one or more of several melamine/urea formaldehyde precursors.

The polycarbonate is preferably polytrimethylene carbonate, which can be used alone, or substituted with a glycol. The glycol can be blended in an amount of 0–30%, preferably about 5–20%.

The glycol component may be selected from aliphatic, alicyclic, and aralkyl glycols. Examples of such glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; and p-xylylenediol. The examples demonstrate the effectiveness of 1,3-propanediol.

Suitable solvents and co-solvents include those listed for use with the modified acrylic coatings. Good results were obtained using methyl isobutyl ketone.

Suitable catalysts may be selected from the acidic catalysts listed for use with the modified acrylic coatings. Example 11 demonstrates the usefulness of p-toluene sulphonic acid.

The baked coatings are prepared by adding polytrimethylene carbonate, optionally substituted with a glycol, melamine/urea formaldehyde, and solvent, and optionally co-solvent, into a kettle and heating at a temperature of about 80–130° C., preferably 100 to 110° C., for about 1 to 10 hours, preferably about 3 to 5 hours under nitrogen gas. The solution obtained at the end of the reaction, as noted in Examples 11 and 12, is clear. These compositions illustrate a few of the formulating options for coatings manufacturers.

The following examples will serve to illustrate specific embodiments of the invention and related embodiments disclosed herein. These examples are intended only as a means of illustration and should not be construed as limiting the scope of the invention in any way. Those skilled in the art will recognize many variations that may be made without departing from the spirit of the disclosed invention.

EXAMPLE 1

Preparation of PTMC Triols

The preferred results were obtained using PTMC diols and triols. Polytrimethylene carbonate triols were prepared by reacting trimethylene carbonate with trimethylol propane. The trimethylene carbonate and trimethylol propane were weighed and measured into a three-necked flask equipped with a stirring bar. Then the mixture was heated slowly to 120° C. and held at that temperature for about three hours. The contents were then analyzed by GC and NMR for unreacted starting materials. The reaction can be represented by the following:

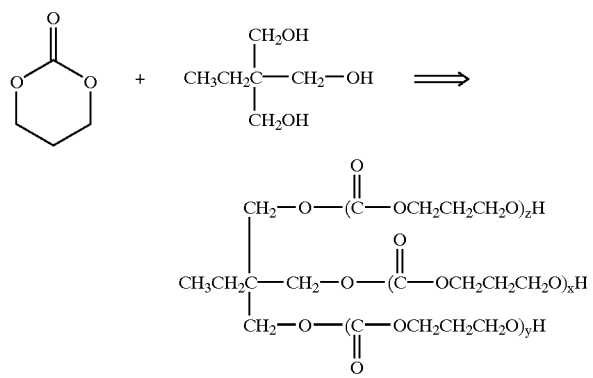

X = 0 to total of TMC units
Y = 0 to total of TMC units
Z = 0 to total of TMC units
X + Y + Z = Total of TMC units Table 1 shows the amounts of starting materials used to make the PTMC triols and the calculated properties:

TABLE 1

|  | P1 | P2 | P3 |
|---|---|---|---|
| STARTING MATERIALS | | | |
| Trimethylene Carbonate parts | 55 | 7B | 85 |
| Trimethylol Propane | 45 | 25 | 15 |
| CALCULATED PROPERTIES | | | |
| Equivalent Weight | 100 | 180 | 300 |
| Molecular Weight | 300 | 540 | 900 |
| TMC units | 1.6 | 4 | 7.5 |

EXAMPLE 2

A number of diol and triols were prepared. The diols were prepared by reacting PTMC with 1,3-propanediol and the triols were prepared by the procedure discussed in Example 1. Although no catalyst was used in Example 1, the diols and triols can be prepared using, for example, dibutyl tin dilaurate or sodium acetate as a catalyst, as discussed in copending U.S. patent application Ser. No. 09/671,572. In the case of sodium acetate, an effective amount is about 50 ppm, based on sodium. The physical properties of these diols and triols are presented in Table 2. All the diols and triols have very low glass transition temperatures ($T_g$), which increase as the polyol molecular weights increase. The triols produced a slightly higher $T_g$ than the diols at similar molecular weights. Depending on the molecular weight, PTMC diols were semisolid or very low melting solids that produced a clear liquid upon melting. Differential Scanning Calorimetry (DSC) indicated that the degree of crystallinity increased with increasing molecular weights. Also, the speed of recrystallization was faster as the molecular weight increased for the molecular weights studied.

In comparison with the PTMC diols, the triols were clear liquids at room temperature. This characteristic provides the triol solutions with an extra degree of stability, hence it is an additional advantage with respect to the suitability of triols for coating formulations.

TABLE 2

Properties of Polytrimethylene Carbonate Polyols

| PTMC | PC 328 | PC 474 | PC 597 | PC 813 | PC 1336 | PT 121 | PT 217 | PT 308 | PT 445 | PT 573 |
|---|---|---|---|---|---|---|---|---|---|---|
| Functionality | Diol | Diol | Diol | Diol | Diol | Triol | Triol | Triol | Triol | Triol |
| Molecular weight | 656 | 948 | 1194 | 1626 | 2672 | 363 | 651 | 924 | 1336 | 1718 |
| Equivalent weight | 328 | 474 | 597 | 813 | 1336 | 121 | 217 | 308 | 445 | 573 |
| Tg (° C.) | −46.4 | −40.9 | −35.6 | −30.2 | −25.7 | −48.9 | −38.8 | −35.9 | −28.3 | −26.3 |
| Melting Point (° C.) | 33.3 | 33.4 | 34.8 | 38.4 | 41.7 | — | — | — | — | — |
| Fusion Heat (J/g) | 0.3 | 7.0 | 17.8 | 32.3 | 39.0 | — | — | — | — | — |

EXAMPLE 3

The purpose of Example 3 was to investigate the solubility of the PTMC diol, PC813 with various solvents. The selection of solvents for the PTMC diols was restricted due to the susceptibility of them to crystallize. The results are shown in Table 3. In Table 3 the symbol "S" means soluble, and that a clear solution was formed. It was determined that propylene glycol methyl ether acetate (PGMA) solubilized PTMC polyols well and was likewise a good solvent for acrylic polyols. Consequently, a mixture of PGMA and methyl ethyl ketone (MEK) was chosen as solvent for the acrylic melamine coatings.

TABLE 3

Solubility of PC813 in some Conventional Solvents

| Solvent | Butyl Acetate | n-Propyl Acetate | Diacetone Alcohol | Methyl Ethyl Ketone | Methyl n-propyl ketone | Methyl Amyl Ketone | Propylene Glycol Methyl Ether Acetate | Ethylene Glycol Methyl Ether acetate | Ethylene Glycol Diacetate | Toluene |
|---|---|---|---|---|---|---|---|---|---|---|
| Room Temp. | I | I | I | S | I | I | S | S | S | I |
| 60° C. | S | S | S | S | S | I | S | S | S | I |
| After Cooling | I | S | S | S | S | I | S | S | S | I |

*Concentration of solutions was 33%.
Abbreviation:
I, insoluble;
S, soluble

EXAMPLE 4

In Example 4, levels of PTMC polyols of 5, 10, 20, and 50% were added to the acrylic polyol and observed for homogeneity. Hazy solutions of acrylic and PTMC polyols indicated polymer immiscibility. The data confirmed that compatibility increased as the PTMC polyol molecular weights decreased. For example, the blend solution of acrylic polyol with as low as 5% PC1336 was hazy, while the solution containing even 50% of PC328 diol was still clear. For the triol system, the blend containing 5% higher molecular weight PT573 was hazy, whereas the solutions containing 50% of PT121 and PT217 were still clear. The data also revealed that the compatibility of PTMC diol or triol with acrylic polyol decreased as the modifier content in the formulations was increased. However, the polytrimethylene carbonate triols are more compatible than the diols at similar molecular weights, i.e. PC474 and PT308 triol. Results are shown in Table 4:

TABLE 4

Compatibility of Polytrimethylene Carbonate Polyols with an Acrylic Polyol

| PTMC Content | PC1336 | PC813 | PC597 | PC474 | PC328 |
|---|---|---|---|---|---|
| 5% | Hazy | Hazy | Slightly Hazy | Clear | Clear |
| 10% | Opaque | Hazy | Hazy | Slightly Hazy | Clear |
| 20% | Opaque | Opaque | Opaque | Hazy | Clear |
| 50% | Opaque | Opaque | Opaque | Opaque | Clear |

TABLE 4-continued

Compatibility of Polytrimethylene Carbonate Polyols with an Acrylic Polyol

| PTMC Content | PT573 | PT445 | PT308 | PT217 | PT121 |
|---|---|---|---|---|---|
| 5% | Hazy | Clear | Clear | Clear | Clear |
| 10% | Hazy | Hazy | Clear | Clear | Clear |
| 20% | Opaque | Hazy | Clear | Clear | Clear |
| 50% | Opaque | Opaque | Slightly Hazy | Clear | Clear |

EXAMPLE 5

Example 5 demonstrates the formulation of the acrylic melamine coatings. Joncryl® 587, a 100% solids acrylic polyol from S. C. Johnson was selected as the commercial acrylic polyol for formulation studies. Joncryl®587 and the PTMC polyols were dissolved in propylene glycol methyl ether acetate (PGMA) and methyl ethyl ketone (MEK) to 50% solids (Table 5). The resulting polyol solutions were then blended in a high-speed mixer. A 75/25 weight ratio of polyols to Cymel®303, a hexamethoxymethylmelamine resin sold by Cytec Industries, Inc., was used to provide crosslinked coatings. A 1% acid catalyst, dinonyl naphthalene disulphonic acid, from King Industries, Inc., sold under the name of Nacure®155, based on resin weight, provided acceptable cure rates for the coatings.

Solutions containing higher molecular weight PTMC diol or triol were hazy, indicating incompatibility with the acrylic polyol (Table 6). However, the solution of pure PTMC polyols with melamine crosslinking agent was totally clear, demonstrating that the polycarbonates themselves were compatible with the crosslinking agent. Coating properties were evaluated after casting films on cold-rolled (Q panel S-36) and iron phosphated steel panels (Q panel S-36-I) and curing for 30 minutes at 150° C.

TABLE 5

Formulation of PTMC Diol Modified Melamine Coatings

| Resin | Control | PC1 | PC2 | PC3 | PC4 | PC5 | PT1 | PT2 | PT3 | PT4 | PT5 |
|---|---|---|---|---|---|---|---|---|---|---|---|
| Joncryl 587, 50% (PGMA) | 60 | 60 | 60 | 60 | 60 | 60 | 60 | 60 | 60 | 60 | 60 |
| PC328, 50% (MEK) | — | 15 | — | — | — | — | — | — | — | — | — |
| PC474, 50% (MEK) | — | — | 15 | — | — | — | — | — | — | — | — |
| PC 597, 50% (MEK) | — | — | — | 15 | — | — | — | — | — | — | — |
| PC813, 50% (MEK) | — | — | — | — | 15 | — | — | — | — | — | — |
| PC1336, 50% (MEK) | — | — | — | — | — | 15 | — | — | — | — | — |
| PT121, 50% (MEK) | — | — | — | — | — | — | 15 | — | — | — | — |
| PT217, 50% (MEK) | — | — | — | — | — | — | — | 15 | — | — | — |
| PT308, 50% (MEK) | — | — | — | — | — | — | — | — | 15 | — | — |
| PT445, 50% (MEK) | — | — | — | — | — | — | — | — | — | 15 | — |
| PT573, 50% (MEK) | — | — | — | — | — | — | — | — | — | — | 15 |
| MEK | 3.0 | 3.75 | 3.75 | 3.75 | 3.75 | 3.75 | 3.75 | 3.75 | 3.75 | 3.75 | 3.75 |
| PGMA | 3.0 | 3.75 | 3.75 | 3.75 | 3.75 | 3.75 | 3.75 | 3.75 | 3.75 | 3.75 | 3.75 |
| Cymel ® 303 | 10 | 12.5 | 12.5 | 12.5 | 12.5 | 12.5 | 12.5 | 12.5 | 12.5 | 12.5 | 12.5 |
| Nacure ® 155, 55% | 0.73 | 0.91 | 0.91 | 0.91 | 0.91 | 0.91 | 0.91 | 0.91 | 0.91 | 0.91 | 0.91 |
| Solid | 53% | 53% | 53% | 53% | 53% | 53% | 53% | 53% | 53% | 53% | 53% |

TABLE 6

Appearance of coating Solutions Before Application

| Coating Composition | PC1336 | PC813 | PC597 | PC474 | PC328 |
|---|---|---|---|---|---|
| 20% PTMC | Opaque | Hazy | Hazy | Near Clear | Clear |

| Coating Composition | PT573 | PT445 | PT308 | PT217 | PT121 |
|---|---|---|---|---|---|
| 20% PTMC | Opaque | Hazy | Clear | Clear | Clear |

EXAMPLE 6

In Example 6 all of the PTMC polyol modified melamine coatings, prepared as described in Example 5, were baked at 150° C. for 30 minutes and tested for humidity resistance. All exhibited excellent humidity resistance. The coatings passed over 500 hours without failure in the ASTM D2247-94 test conducted in a chamber with a heated tank at 40° C.

EXAMPLE 7

In Example 7, the modified acrylic melamine coatings, prepared as described in Example 5, were examined for various properties. Data are shown in Table 7:

TABLE 7

Properties of Cured Coatings

| | Control | PC1 | PC2 | PC3 | PC4 | PC5 | PT1 | PT2 | PT3 | PT4 | PT5 |
|---|---|---|---|---|---|---|---|---|---|---|---|
| Film Thickness (mil) | 1.1 | 1.1 | 1.0 | 1.2 | 1.0 | 1.1 | 1.1 | 1.1 | 1.1 | 1.1 | 1.2 |
| (F./R.) Impact (in. lb.) | 20/<2 | 34/5 | 34/5 | 34/5 | 36/5 | 34/5 | 28/4 | 32/5 | 38/6 | 40/6 | 40/6 |
| Adhesion | 1B | 3B | 4B | 5B | 5B | 5B | 3B | 3B | 3B | 5B | 5B |
| Pencil Hardness | 2H | 2H | 2H | 2H | 2H | 2H | 2H | 2H | 2H | 2H | 2H |
| MEK Rubs 24 hr | >200 | >200 | >200 | >200 | >200 | >200 | >200 | >200 | >200 | >200 | >200 |
| 10% HCl | NE | NE | NE | NE | NE | NE | NE | NE | NE | NE | NE |
| 10% NaOH Spot Tests | NE | NE | NE | NE | NE | NE | NE | NE | NE | NE | NE |
| Mustard | NE | NE | NE | NE | NE | NE | NE | NE | NE | NE | NE |
| Gasoline | NE | NE | NE | NE | NE | NE | NE | NE | NE | NE | NE |
| Color B | 6.37 | 6.28 | 5.98 | 6.15 | 5.86 | 6.08 | 6.06 | 6.10 | 6.10 | 5.9 | 6.31 |
| Yellowness Index | 14.45 | 14.12 | 13.64 | 13.86 | 13.42 | 13.7 | 13.65 | 13.73 | 13.74 | 13.46 | 14.33 |

TABLE 7-continued

Properties of Cured Coatings

|  | Control | PC1 | PC2 | PC3 | PC4 | PC5 | PT1 | PT2 | PT3 | PT4 | PT5 |
|---|---|---|---|---|---|---|---|---|---|---|---|
| Q-UV Test | | | | | | | | | | | |
| Gloss Ren. 20° | 96% | — | — | 92% | — | — | — | 92% | — | — | — |
| Gloss Ren. 60° | 98% | — | — | 98% | — | — | — | 98% | — | — | — |
| Color B | 1.59 | — | — | 0.43 | — | — | — | 0.42 | — | — | — |
| YI Change | 1.35 | — | — | 0.93 | — | — | — | 0.86 | — | — | — |

Flexibility, Hardness and Adhesion

PTMC polyols improved the front and reverse impact resistance of the acrylic melamine coatings. All the diols afforded similar improvements in the coating flexibility, while the triols with higher molecular weight provided more flexibility. The ultimate pencil hardness of the modified coatings was not affected with incorporation of the PTMC polyols.

Incorporation of the PTMC polyol modifiers provided great improvement in the coating adhesion for melamine cured coatings. The control melamine coatings performed poorly with a value of 1B according to the standard testing method ASTM D3359-95. As shown in Table 7, higher molecular weight PTMC polyol modified melamine coatings passed the cross-hatch tape adhesion with a value of 5B, i.e., without failure (Table 7).

Chemical, Stain, and MEK-Rub Resistance

Control and PTMC polyol modified coatings provided excellent acid, caustic, and stain resistance after 24 hours exposure. Modified coatings had good gasoline resistance compared with the control. All the modified and control coatings passed over 200 MEK double rubs without failure (Table 7).

UV Resistance and Color Evaluation

The UV resistance of PTMC polyol modified melamine coatings was evaluated after 500 hours exposure in a Q-UV cabinet using UVA 340 light bulbs at 60° C. with no humidity cycle according to ASTM D4587-91. The results confirmed that color changes for the modified coatings were similar to the control after UV-exposure. A slight gloss reduction was observed at 20° for the PTMC modified coatings. In addition, the PTMC polyol modifiers provided improved yellowing resistance compared to the control.

EXAMPLE 8

In Example 8 white topcoats based on Joncryl 587 modified with 20% PC597 and $TiO_2$ were formulated to a pigment to binder ratio of 0.7/1 and a resin/melamine ratio of 75/25 by weight and cured at 149° C. for 30 minutes. The modified PTMC polyol melamine coatings were tested for a number of properties. The tests showed improvements in adhesion and impact, with other properties being essentially unaffected. Results are shown in Table 8:

TABLE 8

Properties of PTMC Modified Pigmented Melamine Coatings

| Sample | Pencil Hardness | Adhesion | Front Impact (in-pl) | Reverse Impact (in-pl) | Humidity Resistance (hours) | 24-Hour Spot Test | | | |
|---|---|---|---|---|---|---|---|---|---|
| | | | | | | HCl | NaOH | Gasoline | Mustard |
| Control | 3H | 1B | 16 | <2 | >500 | 10 | 10 | 9 | 10 |
| 20% PC597 | 3H | 5B | 25 | 2 | >500 | 10 | 10 | 9 | 10 |

| Sample | Color B | Yellow-Ness | Gloss 20° | Gloss 60° | MEK Double Rubs | Q-UV Test | | | |
|---|---|---|---|---|---|---|---|---|---|
| | | | | | | Gloss 20° | Gloss 60° | Color B Change | YI Change |
| Control | −0.81 | −1.28 | 36 | 82 | >200 | 33 | 79 | 0.24 | 0.38 |
| 20% PC597 | −0.88 | −1.42 | 34 | 81 | >200 | 32 | 79 | 0.18 | 0.32 |

EXAMPLE 9

Example 9 demonstrates the formulation of 5% and 50% PTMC polyols modified acrylic melamine coatings. Joncryl 587 and the PTMC polyols were dissolved in propylene glycol methyl ether acetate (PGMA) and methyl ethyl ketone (MEK) to 50% solids. The resulting polyol solutions were then blended in a high-speed mixer. A 75/25 weight ratio of polyols to melamine resin was used to provide crosslinked coatings. A 1% acid catalyst, dinonyl naphthalene disulphonic acid, based on resin weight, provided acceptable cure rates for the coatings.

Coating properties were evaluated after casting films on cold-rolled (Q panel S-36) and iron phosphated steel panels (Q panel S-36-I) and curing for 30 minutes at 150° C. PTMC polyols improved the front and reverse impact resistance and the adhesion of the melamine coatings. The ultimate pencil hardness of the modified coatings was not affected with incorporation of the PTMC polyols. The control and modified coatings provided excellent acid, caustic, and stain resistance after a 24 hour exposure. Modified coatings had good gasoline resistance compared with the control. All the modified and control coatings passed over 200 MEK double rubs without failure. Data are shown in Tables 9 and 10:

TABLE 9

Formulations of 5% and 50% PTMC modified melamine coatings

| Resin | Joncryl 587 | 5% PC328 | 5% PT217 | 50% PC328 | 50% PT217 |
|---|---|---|---|---|---|
| Joncryl 587, 50% in PGMA | 48.00 | 54.00 | 54.00 | 21.00 | 21.00 |
| Joncryl 587, 50% in MEK | 12.00 | 6.00 | 6.00 | 12.00 | 12.00 |
| PC328, 50% in PGMA | — | 3.16 | — | 33.00 | — |
| PT217, 50% in PGMA | — | — | 3.16 | — | 33.00 |
| MEK | 1.33 | 4.72 | 4.72 | 1.15 | 1.15 |
| PGMA | 5.33 | 2.30 | 2.30 | 1.60 | 1.60 |

TABLE 9-continued

Formulations of 5% and 50% PTMC modified melamine coatings

| Resin | Joncryl 587 | 5% PC328 | 5% PT217 | 50% PC328 | 50% PT217 |
|---|---|---|---|---|---|
| Cymel 303 | 10.00 | 10.53 | 10.53 | 11.00 | 11.00 |
| Nacure 155, 55% | 0.73 | 0.77 | 0.77 | 0.80 | 0.80 |
| Weight | 79.33 | 83.51 | 83.51 | 82.68 | 82.68 |

TABLE 10

Properties of 5% and 50% PTMC modified melamine coatings

| | Joncryl 587 | 5% PC328 | 5% PC474 | 5% PT217 | 5% PT308 | 5% PT445 | 50% PC328 | 50% PC474 | 50% PT217 | 50% PT308 | 50% PT445 |
|---|---|---|---|---|---|---|---|---|---|---|---|
| Film Thickness (mil) | 1.1 | 1.1 | 1.1 | 1.1 | 1.1 | 1.1 | 1.2 | 1.2 | 1.1 | 1.2 | 1.1 |
| (F./R.) Impact (in. lb.) | 20/<2 | 24/4 | 22/3 | 22/<2 | 22/3 | 24/4 | 80/60 | 70/40 | 34/6 | 48/10 | 50/30 |
| Adhesion | 1B | 3B | 3B | 3B | 2B | 4B | 4B | 4B | 4B | 4B | 5B |
| Pencil Hardness | 2H | 2H | 2H | 2H | 2H | 2H | H–2H | 2H | 2H | 2H | 2H |
| MEK Rubs | >200 | >200 | >200 | >200 | >200 | >200 | >200 | >200 | >200 | >200 | >200 |
| 24-hour Spot Tests | | | | | | | | | | | |
| 10% HCl | NE | NE | NE | NE | NE | NE | NE | NE | NE | NE | NE |
| 10% NaOH | NE | NE | NE | NE | NE | NE | NE | NE | NE | NE | NE |
| Mustard | NE | NE | NE | NE | NE | NE | NE | NE | NE | NE | NE |
| Gasoline | NE | NE | NE | NE | NE | NE | NE | NE | NE | NE | NE |
| 20° Gloss | 92 | 92 | 91 | 94 | 91 | 92 | 90 | 47 | 84 | 82 | 75 |
| 60° Gloss | 120 | 120 | 121 | 120 | 120 | 119 | 112 | 84 | 116 | 114 | 96 |

EXAMPLE 10

Example 10 demonstrates the related alternative embodiment comprising the formulation of a melamine/urea formaldehyde polytrimethylene carbonate coating composition. In this example a coating composition is made from PTMC, CYMEL®327, MIBK as the solvent, and p-toluene sulphonic acid (PTSA) solution as catalyst. In a 500 ml resin kettle, the following were added: PTMC (number-average MW 3400, 53.2 gm), CYMEL®327 (106.2 gm) and MIBK (81.8 gm) and PTSA solution (1:99 PTSA: MIBK, 12.6 g). This mixture was heated at 100° C. for 5 hrs. under $N_2$ gas, using a reflux condenser. The solution obtained at the end of the reaction, designated 23720-184, was clear. Samples of 23720-184(20-grams) were made up into blends as shown below in Table 11. Some of the blends had FC430 added to help improve wetness, in order to obtain a smooth coat. Each sample was aged by rolling its container at 23° C. over one or two nights as indicated. The sample was then cast on a QD412 stainless steel panel using Rod #42 and the panel coating cured 20 minutes at 175° C. Panels were cooled for one hour to approximately room temperature, visually examined for clarity, and tested for mar and adhesion. Mar test was by attempting to damage with the nylon guide bar of an adhesion test cutter. Adhesion testing was according to ASTM D-3359-95, method B.

TABLE 11

| Sample identification | 23720-184 | PDO | PTSA, 1% in MIBK | Aged (hrs) | ADHE-SION | MAR | APPEAR-ANCE | Substrate Material |
|---|---|---|---|---|---|---|---|---|
| 23720-184-1 | 20 gm. | | 1.2 gm | 40 | 2 | POOR | HAZY | QD 412 (SS) |
| 23720-184-2 | 20 gm | | 2.4 gm | 40 | 0 | POOR | HAZY | QD12 (SS) |
| 23720-184-3 | 20 gm | | 4.8 gm | 40 | 0 | FAIR | HAZY | QD412 (SS) |
| 23720-184-4 | 20 gm | | 8.4 gm | 40 | 0 | FAIR | HAZY | QD412 (SS) |
| 23720-184-5 | 20 gm | 1 gm | 0 gm | 40 | 4 | POOR | HAZY | QD412 (SS) |
| 23720-184-6 | 20 gm | 2 gm | 0.6 gm | 40 | 2 | POOR | HAZY | QD412 (SS) |
| 23720-184-A | 20 gm | | 0 gm | 16 | 4 | FAIR | CLEAR | QD412 ((SS) |
| 23720-184-B | 20 gm | | 1.2 gm | 16 | 3 | GOOD | SLIGHTLY HAZY | QD412 (SS) |
| 23720-184-2B | 20 gm | | 1.2 gm | 16 | 4 | GOOD | CLEAR | QD412 (SS) |

EXAMPLE 11

Example 11 also demonstrates the alternative embodiment comprising the formulation of a coating from PTMC, 1,3-propanediol, CYMEL®327, and MIBK as the solvent, without a catalyst. In a 500 ml resin kettle, the following were added: PTMC (number-average MW 3400, 41.75 gm), 1,3-PDO (41.75 gm), CYMEL®327 (83.5 gm) and MIBK (142.8 gm). This mixture was heated at 110° C. for 3 hrs. under $N_2$, using a reflux condenser. The solution obtained at the end of the reaction, identified as 23720-181, was clear. Sample blends were made and evaluated similarly to Example 11, except that all aging was for 16 hours. The only difference among samples was the amount of PTSA solution (if any) added to 20 g of 23720-181 before aging. Unlike Example 10, a variety of substrates were used. Details and results are in Table 12:

TABLE 12

| Sample Identification | PTSA, 1% in MIBK | Substrate Material | Adhesion | Mar | Appearance |
|---|---|---|---|---|---|
| 23720-181 | None | QD-412 (SS) | 4 | POOR | CLEAR |
| 23720-181-1 | 1.1 gm | QD-412 (SS) | 0 | GOOD | CLEAR |
| 23720-181-2 | 2.2 gm | QD-412 (SS) | 0 | GOOD | CLEAR |
| 23720-181-3 | 3.3 gm | QD-412 (SS) | 0 | GOOD | CLEAR |
| 23720-181-4 | 4.4 gm | QD-412 (SS) | 0 | GOOD | CLEAR |
| 23720-181-5 | 5.5 gm | QD-412 (SS) | 0 | POOR | HAZY |
| 23720-181-6 | 6.6 gm | QD-412 (SS) | 0 | POOR | HAZY |
| 23720-181-7 | 7.7 gm | QD-412 (SS) | 0 | POOR | HAZY |
| 23720-181 | None | Epoxy-primed steel | 2 | POOR | HAZY |
| 23720-181-1 | 1.1 gm | Epoxy-primed steel | 2 | POOR | HAZY |
| 23720-181-2 | 2.2 gm | Epoxy-primed steel | 5 | GOOD | CLEAR |
| 23720-181-3 | 3.3 gm | Epoxy-primed steel | 5 | GOOD | CLEAR |
| 23720-181 | None | A-412 (Aluminum) | 2 | GOOD | HAZY |
| 23720-181-1 | 1.1 gm | A-412 (Aluminum) | 0 | FAIR | SLIGHTLY HAZY |
| 23720-181-2 | 2.2 gm | A-412 (Aluminum) | 0 | GOOD | HAZY |
| 23720-181-3 | 3.3 gm | A-412 (Aluminum) | 0 | GOOD | HAZY |
| 23720-181-4 | 4.4 gm | A-412 (Aluminum) | 0 | GOOD | HAZY |
| 23720-181-5 | 5.5 gm | A-412 (Aluminum) | 0 | POOR | HAZY |
| 23720-181-6 | 6.6 gm | A-412 (Aluminum) | 0 | POOR | HAZY |
| 23720-181-7 | 7.7 gm | A-412 (Aluminum) | 0 | POOR | HAZY |
| 23720-181 | None | Galvanized Steel | 2 | POOR | SLIGHTLY HAZY |
| 23720-181-1 | 1.1 gm | Galvanized Steel | 2 | POOR | SLIGHTLY HAZY |
| 23720-181-2 | 2.2 gm | Galvanized Steel | 2 | GOOD | SLIGHTLY HAZY |
| 23720-181-3 | 3.3 gm | Galvanized Steel | 2 | GOOD | CLEAR |

We claim:

1. Acrylic melamine coating compositions characterized by improved impact resistance comprising:
   a) a polyol having an equivalent weight of about 300–1300;
   b) said polyol having incorporated therein 5 to 20% by weight of a polytrimethylene carbonate polyol;
   c) a melamine crosslinking agent;
   d) optionally a catalyst; and
   e) optionally pigments and other additives commonly used in coatings.

2. The composition of claim 1 wherein the polytrimethylene carbonate polyol is selected from polytrimethylene carbonate diol, polytrimethylene carbonate triol, and a higher functionality polytrimethylene carbonate polyol.

3. The composition of claim 1 (a) wherein the polyol is selected from the group consisting of polyester polyols and acrylic polyols.

4. The composition of claim 3 wherein the acrylic polyol is selected from the group consisting of copolymers of one or more alkyl esters of acrylic acid or methacrylic acid optionally together with one or more other polymerizable ethylenically unsaturated monomers.

5. The composition of claim 4 wherein the suitable alkyl esters of acrylic acid or methacrylic acid are selected from the group consisting of methyl methacrylate, ethyl methacrylate, butyl methacrylate, ethyl acrylate, butyl acrylate, and 2-ethyl hexyl acrylate.

6. The composition of claim 4 wherein the copolymerizable ethylenically unsaturated monomers are selected from the group consisting of vinyl aromatic compounds, nitriles, vinyl and vinylidene halides, and vinyl esters.

7. The composition of claim 6 further comprising the use of suitable functional monomers for crosslinking purposes selected from the group consisting of acrylic acid, methacrylic acid, hydroxyalkyl acrylates, and hydroxyalkyl methacrylates.

8. The composition of claim 3 wherein the polyol is selected from acrylic polyols having an equivalent weight in the range of 300 to 1300.

9. The composition of claim 8 further comprising an acrylic polyol having a hydroxyl number in the range of 80–140 and an equivalent weight in the range of 400 to 700.

10. The composition of claim 1 further comprising the acrylic polyol dissolved in a solvent selected from the group consisting of esters, ketones, glycol ethers and esters, and alcohols.

11. The composition of claim 10 wherein the solvent is selected from the group consisting of butyl acetate, n-propyl acetate, methyl ethyl ketone, methyl n-propyl ketone, methyl amyl ketone, propylene glycol methyl ether acetate, ethylene glycol methyl ether acetate, and ethylene glycol diacetate.

12. The composition of claim 11 wherein the solvent is selected from glycol ethers and glycol esters and combinations thereof.

13. The composition of claim 12 wherein the solvent is propylene glycol methyl ether acetate.

14. The composition of claim 10 further comprising the use of a co-solvent.

15. The composition of claim 14 wherein the co-solvent is methyl ethyl ketone (MEK).

16. The composition of claim 1 wherein a catalyst comprising an acid catalyst is used to accelerate the formation of the composition.

17. The composition of claim 16 wherein the acid catalyst is selected from the group consisting of p-toluenesulfonic acid, xylene sulfonic acid, dodecyl benzene sulfonic acid, didodecyl naphthalene sulfonic acid, didodecyl naphthalene sulfonic acid, dinonyl naphthalene sulfonic acid, dinonyl naphthalene disulfonic acid, their amine blocks, and phosphoric acid and combinations thereof.

18. The composition of claim 17 wherein said acid catalyst is used and comprises dinonyl naphthalene disulphonic acid.

19. The composition of claim 18 wherein an acid catalyst is used in an amount of 0.1 to 3.0% based on the total weight of the resin.

20. The composition of claim 19 wherein an acid catalyst is used in an amount of 0.5 to 2.0%, based on the total weight of the resin.

21. The composition of claim 1 wherein the melamine crosslinking agent is a resin obtained by addition-condensation of an amine compound selected from the group consisting of melamine, guanamine, and urea with formaldehyde by art-known methods.

22. The composition of claim 21 wherein said amines condensed with formaldehyde are further condensed with alcohol.

23. The composition of claim 22 wherein the melamine crosslinking agent is selected from the group consisting of methylated melamine, butylated melamine, methylated benzoguanamine, and butylated benzoguanamine.

24. The composition of claim 1 wherein the melamine crosslinking agents are selected from fully or partially alkylated methylolated melamine resins.

25. The composition of claim 24 wherein the melamine crosslinking agent is selected from the group consisting of hexamethylol melamine, pentamethylol melamine, and tetramethylol melamine, or mixtures of two or more thereof.

26. The composition of claim 1 wherein the melamine resin is selected from hydrophilic melamines and hydrophobic melamines individually, or in combinations.

27. The composition of claim 26 wherein the melamine resin is hexamethoxymethylmelamine resin.

28. The composition of claim 1 wherein a pigment is used selected from those known in the art.

29. The composition of claim 28 wherein the pigment is titanium dioxide.

30. An acrylic melamine coating composition characterized by higher impact resistance and high gloss which comprises:
   a) An acrylic polyol having an equivalent weight in the range of 300 to 1300 dissolved in a suitable solvent to 40–70% solids;
   b) Said acrylic polyol having substituted therein 5 to 20% by weight of a polytrimethylene carbonate polyol selected from a polytrimethylene carbonate diol and polytrimethylene carbonate triol, and higher functionality trimethylcarbonate polyols;
   c) A methyl substituted melamine;
   d) Optionally a catalyst; and
   e) Optionally pigments and other additives known in the art.

31. Any article coated with the composition of claim 30.

32. A melamine/urea formaldehyde polytrimethylene carbonate coating composition comprising:
   a) 5 to 80% by weight polytrimethylene carbonate, optionally blended with 0 to 30% glycol;
   b) 5 to 70% by weight melamine crosslinking agent;
   c) 0 to 70% solvent; and
   d) Optionally a catalyst.

33. The composition of claim 32 wherein the melamine crosslinking agent is a partially alkoxylated melamine resin.

34. The composition of claim 33 wherein the melamine crosslinking agent is hexamethoxymethylmelamine.

35. The composition of claim 32 wherein a catalyst is used and comprises an acid catalyst.

36. The composition of claim 35 wherein the acid catalyst is selected from the group consisting of p-toluene sulfonic acid, xylene sulfonic acid, dodecyl benzene sulfonic acid, didodecyl naphthalene sulfonic acid, didodecyl naphthalene sulfonic acid, dinonyl naphthalene sulfonic acid, dinonyl naphthalene disulfonic acid, their amine blocks, and phosphoric acid and combinations thereof.

37. The composition of claim 32 wherein the glycol is selected from aliphatic, alicyclic, and aralkyl glycols.

38. The composition of claim 37 wherein the glycol is selected from ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; and p-xylylene, and combinations thereof.

39. The composition of claim 38 wherein the diol is 1,3-propanediol.

40. The composition of claim 39 wherein 1,3-propanediol is blended in an amount of 5–25%.

* * * * *